(12) United States Patent
Ceccarelli et al.

(10) Patent No.: US 9,130,668 B2
(45) Date of Patent: Sep. 8, 2015

(54) SIGNALLING IN OPTICAL TRANSMISSION NETWORKS

(75) Inventors: Daniele Ceccarelli, Genoa (IT); Diego Caviglia, Savona (IT); Giulio Bottari, Leghorn (IT)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 148 days.

(21) Appl. No.: 12/994,366

(22) PCT Filed: Jul. 23, 2010

(86) PCT No.: PCT/EP2010/060700
§ 371 (c)(1),
(2), (4) Date: Mar. 11, 2013

(87) PCT Pub. No.: WO2012/010213
PCT Pub. Date: Jan. 26, 2012

(65) Prior Publication Data
US 2013/0163981 A1    Jun. 27, 2013

(51) Int. Cl.
*H04B 10/038* (2013.01)
*H04B 10/00* (2013.01)
*H04J 14/02* (2006.01)

(52) U.S. Cl.
CPC .......... *H04B 10/038* (2013.01); *H04J 14/0221* (2013.01); *H04J 14/0258* (2013.01); *H04J 14/0267* (2013.01); *H04J 14/0268* (2013.01); *H04J 14/0212* (2013.01);
(Continued)

(58) Field of Classification Search
CPC .............. H04J 14/0221; H04J 14/0268; H04J 14/0258; H04J 14/0267
USPC ......................... 398/43, 57, 58, 1, 2
See application file for complete search history.

(56) References Cited

U.S. PATENT DOCUMENTS

| 2003/0016410 A1* | 1/2003 | Zhou et al. ................... 359/110 |
| 2004/0100684 A1* | 5/2004 | Jones et al. .............. 359/337.11 |
| 2004/0107382 A1* | 6/2004 | Doverspike et al. .............. 714/4 |

(Continued)

FOREIGN PATENT DOCUMENTS

| WO | 2009/095416 A1 | 8/2009 |
| WO | WO 2009095416 A1 * | 8/2009 |

OTHER PUBLICATIONS

Lang, et al., "RSVP-TE Extension in Support of End-to-End Generalized Multi-Protocol Label Switching (GMPLS) Recovery," RFC 4872, May 2007.
(Continued)

*Primary Examiner* — Oommen Jacob
(74) *Attorney, Agent, or Firm* — Baker Botts, LLP

(57) ABSTRACT

A connection-oriented optical network (2) comprises nodes (10) and optical links (5) between nodes. Each node (10) has a power control unit (60) for controlling an optical amplifier (43) at the node. A node, in response to a requirement to set up a new connection in the network, signals to a power control unit (60) at each of a plurality of downstream nodes along a path of the new connection to cause the power control unit at the node to adjust the optical amplifier at the node to support a new optical channel to carry the new connection. The node (10) can signal to tear down an existing connection in a similar way. A downstream node determines a number of optical channels for which the optical amplifier can be adjusted concurrently, based on an existing number of active optical channels.

14 Claims, 8 Drawing Sheets

(52) U.S. Cl.
CPC ......... *H04J 14/0289* (2013.01); *H04J 14/0293* (2013.01); *H04Q 2213/1301* (2013.01)

(56) References Cited

U.S. PATENT DOCUMENTS

| | | |
|---|---|---|
| 2005/0018595 A1 | 1/2005 | Conroy et al. |
| 2010/0067899 A1 | 3/2010 | Li et al. |
| 2013/0163981 A1* | 6/2013 | Ceccarelli et al. ................. 398/2 |
| 2013/0177305 A1* | 7/2013 | Prakash et al. .................... 398/5 |

OTHER PUBLICATIONS

Sole-Pareta, et al., "Some Open Issues in the Optical Networks Control Plane," IEEE 2003.

* cited by examiner

SIGNALLING IN OPTICAL TRANSMISSION NETWORKS

This application is the U.S. national phase of International Application No. PCT/EP2010/060700, filed 23 Jul. 2010, which designated the U.S. and is hereby incorporated by reference.

TECHNICAL FIELD

This invention relates to optical transmission networks, and to set-up and tear-down of connections in such a network.

BACKGROUND

Optical transmission networks allow all-optical transmission between network nodes. Traffic is carried by optical channels, called lambdas, and optical switching technology, such as Wavelength Selective Switches (WSS), allow lambdas to be switched at nodes.

A control plane can be added to this kind of network to allow automated set-up of paths, tear-down of paths and traffic recovery when faults occur in the network. A possible control plane is the Generalized Multi Protocol Label Switching (GMPLS) protocol suite being developed by the Internet Engineering Task Force (IETF). The GMPLS application for optical networks is called Wavelength Switched Optical Network (WSON).

One issue in this type of network is the relatively long time required to set-up a path. This is a particular problem during traffic recovery operations. When a fault occurs in the network, it is desirable that traffic is transferred to an alternative path as quickly as possible. Delay in setting up the alternative path can result in heavy loss of traffic.

SUMMARY

A first aspect of the invention provides a method of operating a first node in a connection-oriented optical network comprising nodes and optical links between nodes. Each node has a power control unit for controlling an optical amplifier at the node. At the first node, the method comprises, in response to a requirement to set up a new connection in the network, signalling to a power control unit at each of a plurality of downstream nodes along a path of the new connection to cause the power control unit at the node to adjust the optical amplifier at the node to support a new optical channel to carry the new connection. Additionally, or alternatively, the method comprises, in response to a requirement to tear-down an existing connection in the network, signalling to a power control unit at each of a plurality of downstream nodes along a path of the existing connection to cause the power control unit at the node to adjust the optical amplifier at the node to switch off an optical channel used by the existing connection.

The signalling allows the power control units at nodes along a path of the connection to adjust their respective optical amplifiers substantially at the same time (i.e. in parallel with each other). This reduces the time needed to activate, or tear-down, a connection and reduces the amount of dropped traffic during a traffic recovery operation.

Advantageously, there is an initial step of reserving resources for the new connection at the plurality of nodes along the path of the new connection and the signalling identifies the new connection.

A further aspect of the invention provides a method of operating a node in a connection-oriented optical network in which connections between nodes of the network are carried by optical channels. The node has an optical amplifier and a power control unit for controlling the optical amplifier. The method comprises receiving signalling at the node. The method further comprises adjusting the optical amplifier, in response to the signalling, to support an optical channel to be used by a new connection. Additionally, or alternatively, the method comprises adjusting the optical amplifier to switch off an optical channel used by an existing connection.

The node adjusts the optical amplifier at the node substantially at the same time as other nodes along a path of the connection (i.e. in parallel with other nodes). This reduces the time needed to activate, or tear-down, a connection and reduces the amount of dropped traffic during a traffic recovery operation.

A plurality of connections can be activated, or torn down, at the same time. The step of receiving signalling comprises receiving signalling at the power control unit of the node in respect of a plurality of connections. The adjusting step comprises determining a number of optical channels for which the optical amplifier can be adjusted concurrently, based on an existing number of active optical channels. The method further comprises adjusting the optical amplifier for the determined number of optical channels. This further reduces the time needed to activate, or tear-down, a connection and further reduces the amount of dropped traffic during a traffic recovery operation. The steps of determining a number of optical channels and adjusting the optical amplifier are performed iteratively, until the optical amplifier has been adjusted for the plurality of connections.

In any of the embodiments, the adjusting of the optical amplifier can be a power levelling process. A power levelling process distributes an output power level of an optical amplifier across a required number of lambdas over a period of time and can increase, or reduce, the output power of the optical amplifier during the levelling process.

The power control unit at a node is a unit which controls the optical amplifier. In a conventional node a power monitoring unit (PMU) monitors lambdas in use on an ingress link and controls application of power to lambdas on an egress link based on what has been detected on the ingress link. The power control unit in embodiments of the present invention may have a monitoring function, or this may be omitted.

Further aspects of the invention provide apparatus for performing any of the described methods.

An aspect of the invention provides apparatus for use at a first node in a connection-oriented optical network comprising nodes and optical links between nodes. Each node has a power control unit for controlling an optical amplifier at the node. The apparatus comprises, at the first node, a signalling module which is arranged, in response to a requirement to set up a new connection in the network, to signal to a power control unit at each of a plurality of downstream nodes along a path of the new connection to cause the power control unit at the node to adjust the optical amplifier at the node to support a new optical channel to carry the new connection. Additionally, or alternatively, the signalling module is arranged, in response to a requirement to tear-down an existing connection in the network, to signal to a power control unit at each of a plurality of downstream nodes along a path of the existing connection to cause the power control unit at the node to adjust the optical amplifier at the node to switch off an optical channel used by the existing connection.

Another aspect of the invention provides apparatus for use at a node in a connection-oriented optical network in which connections between nodes of the network are carried by optical channels. The apparatus comprises an optical amplifier and a power control unit for controlling the optical amplifier. The apparatus further comprises a signalling module for receiving signalling. The power control unit is arranged to adjust the optical amplifier, in response to signalling received by the signalling module, to support an optical channel to be used by a new connection. Additionally, or alternatively, the power control unit is arranged to adjust the optical amplifier, in response to signalling received by the signalling module, to switch off an optical channel used by an existing connection.

The functionality described here can be implemented in hardware, software executed by a processing apparatus, or by a combination of hardware and software. The processing apparatus can comprise a computer, a processor, a state machine, a logic array or any other suitable processing apparatus. The processing apparatus can be a general-purpose processor which executes software to cause the general-purpose processor to perform the required tasks, or the processing apparatus can be dedicated to perform the required functions. Another aspect of the invention provides machine-readable instructions (software) which, when executed by a processor, perform any of the described methods. The machine-readable instructions may be stored on an electronic memory device, hard disk, optical disk or other machine-readable storage medium. The machine-readable instructions can be downloaded to the storage medium via a network connection.

BRIEF DESCRIPTION OF THE DRAWINGS

Embodiments of the invention will be described, by way of example only, with reference to the accompanying drawings in which.

DETAILED DESCRIPTION

Figure 1:
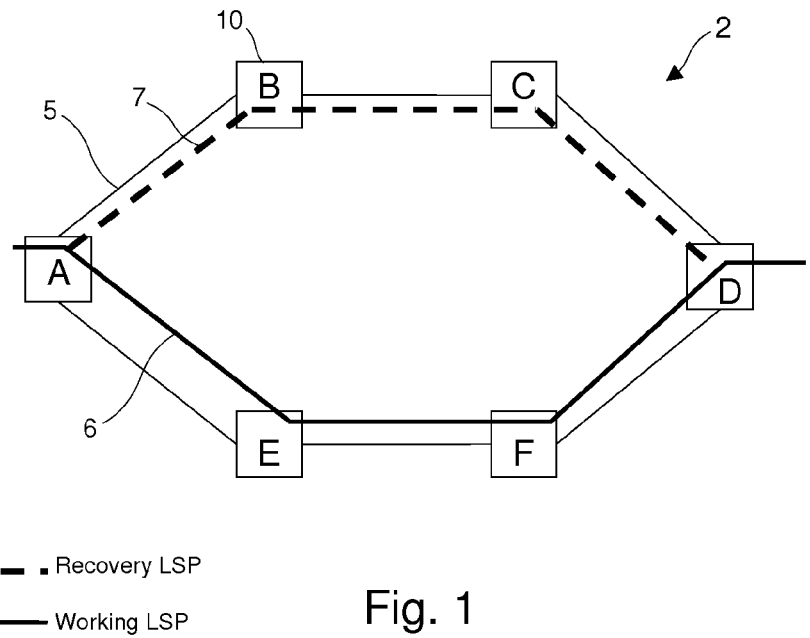
FIG. 1 shows an optical transmission network.

FIG. 1 shows an optical transmission network 2 with nodes A-F. Optical transmission links 5 connect nodes 10. Traffic is carried on links 5 by wavelength channels, called lambdas. Each node has optical transceivers for optically transmitting traffic on lambdas and for optically receiving traffic on lambdas. Advantageously, a node comprises a wavelength selective-switch which is arranged to forward traffic based on wavelength of the lambda. At a node, traffic received on a lambda on an ingress link is selectively forwarded to an egress link. The transceiver at a node includes an optical amplifier which can be tuned to apply power to particular lambdas that are in use. A node in an optical network is typically called a Reconfigurable Optical Add Drop Multiplexer (ROADM).

Embodiments of the invention generally apply to any situation where there is a need to set-up or tear-down a connection or lightpath. The terms "connection" and "lightpath" will be used interchangeably. One situation where a quick set-up of a connection is required is for traffic recovery, following detection of a fault.

FIG. 1 shows a connection 6 configured with the routing A-E-F-D. This forms a working path for traffic between nodes A and D. The connection can use the same lambda on each link from node A to node D, or some wavelength conversion can be performed at an intermediate point along the connection. In a GMPLS network, a connection is described as a Label Switched Path (LSP). FIG. 1 also shows a recovery path 7 with the routing A-B-C-D for traffic on the working path 6. When a fault occurs on the working path, the fault is detected and the recovery path 7 is activated. Traffic is then transferred to the recovery path 7. There are various ways of preparing recovery paths in the network. The recovery path can be pre-computed and pre-signalled. This means that the route of the recovery path has been pre-planned and nodes along the path have been signalled, in advance of detecting any fault, to inform the nodes that they form part of a recovery path and should reserve resources for the recovery path. When a fault occurs, signalling is sent along the recovery path to activate the recovery path. Activation comprises cross-connection of resources at a node along the recovery path. RFC4872 describes various types of recovery and ways of preparing recovery paths.

Figure 2:
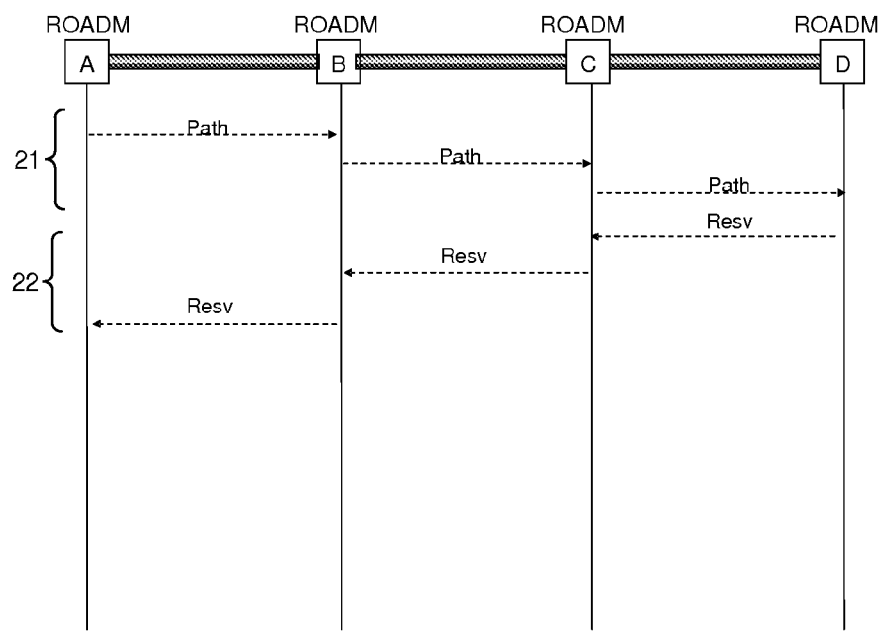
FIG. 2 shows pre-signalling in the network of FIG. 1 to set up a connection.

Before describing embodiments of the invention in detail, an existing method of setting up connections in an optical network will be described with reference to FIGS. 2 to 4. FIG. 2 shows preliminary signalling to reserve resources along the path A-B-C-D. An RSVP-TE Path message is sent along the path of the required connection. When the Path message reaches the end node D, a RESV message is returned along the same path. This signalling reserves resources for the new connection at each node. This concludes the preliminary signalling to set up the connection. Further signalling is required to activate the connection. If the connection is required immediately, node A proceeds to activate the connection. If the connection is a recovery path, then node A waits to receive a notification that the recovery path is needed before activating the connection.

Figure 3:
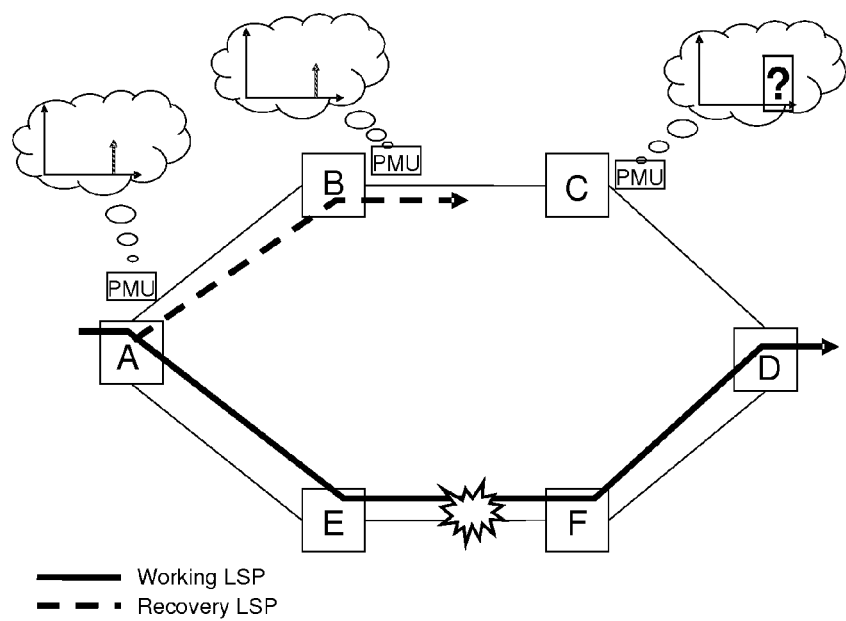
FIGS. 3 and 4 show a conventional way of establishing the connection of FIG. 2 at nodes along the path of the connection.
Figure 4:
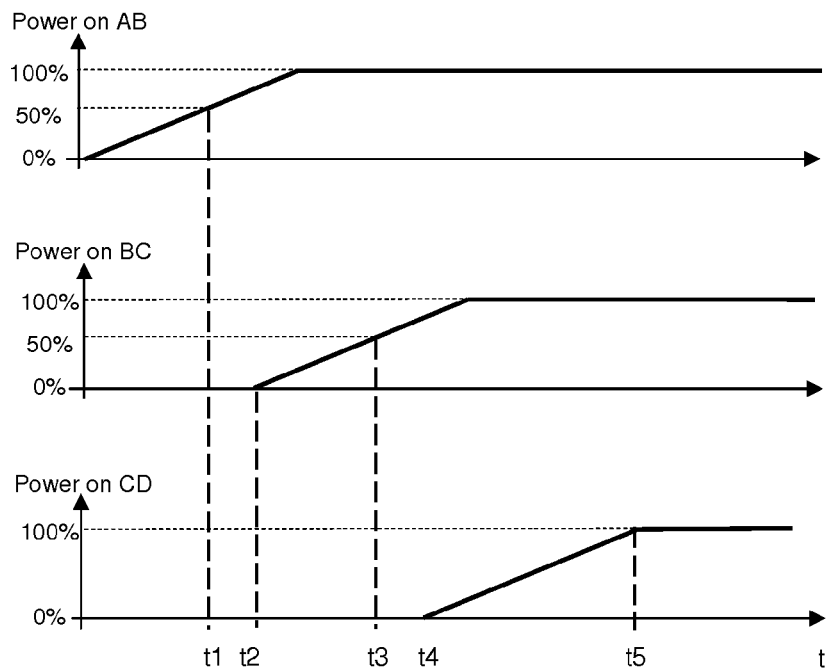

FIGS. 3 and 4 show the stage of activating the connection. The recovery LSP is cross-connected at node A. The lambda related to this connection is then given power. Each node has a Power Monitoring Unit (PMU) to control an optical amplifier at the node, The PMU at node A increases the power of the required lambda along link A-B from 0% to 100%. The power is applied slowly, to avoid disturbing existing channels. Reaching 100% takes of the order of minutes. The power reaches a certain threshold, such as 50%, at time t1. A PMU at downstream node B repeatedly monitors the whole transmission spectrum to detect changes in the lambdas. A full scan of the spectrum takes of the order of seconds, typically 1.5 seconds. A new lambda is considered "present" if it is detected three consecutive times, and so its presence is detected after 5 seconds. At time t2 the PMU at node B detects the newly activated lambda. Node B cross-connects the connection and increases power of that lambda on link B-C. In a similar way, node C will detect the newly activated lambda after a delay, at time t4, cross-connect the connection, and apply power to the lambda on link C-D. The process concludes with node D detecting the newly activated lambda. The overall time taken to set up the recovery path ABCD, following detection of a fault is:

ramp up time, lambda power from 0% to 50% on $AB \sim 2$ min+ detection time at node $B \sim 5$ sec+ ramp up time, lambda power from 0% to 50% on $BC \sim 2$ min+ detection time at node $C \sim 5$ sec+ ramp up time, lambda power from 0% to 100% on $CD \sim 4$ min

The total time is $\sim 8$ mins, 10 secs.

The preliminary signalling (Path message+RESV message) to set up the recovery path has a much shorter timescale of around 100 ms. It should be understood that all of the values stated above are approximate, and are stated to give an idea of the overall time required for the connection set up.

Figure 5:
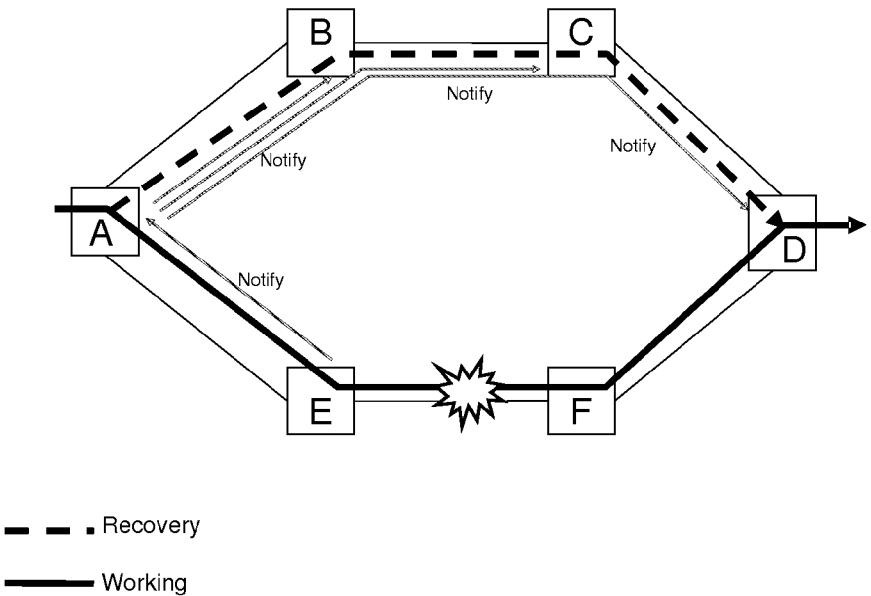
FIGS. 5 and 6 show signalling according to an embodiment of the invention.

An embodiment of the invention will now be described, with reference to FIGS. 5 to 7. The same recovery path between nodes A-B-C-D is considered. The first stage of the process to set-up a connection is the same as previously described. An RSVP-TE Path message is sent along the path of the required connection. When the Path message reaches the end node D, a RESV message is returned along the same path. This signalling reserves resources for the new connection at each node. This concludes the preliminary signalling to set up the connection. A further step is required to activate the connection. If the connection is required immediately, node A proceeds to activate the connection. If the path is a recovery path, then node A waits to receive a notification that the recovery path is needed. FIG. 5 shows an example of a fault on link E-F. The fault is detected by node E and a notification is sent to node A to activate the recovery path A-B-C-D.

Figure 6:
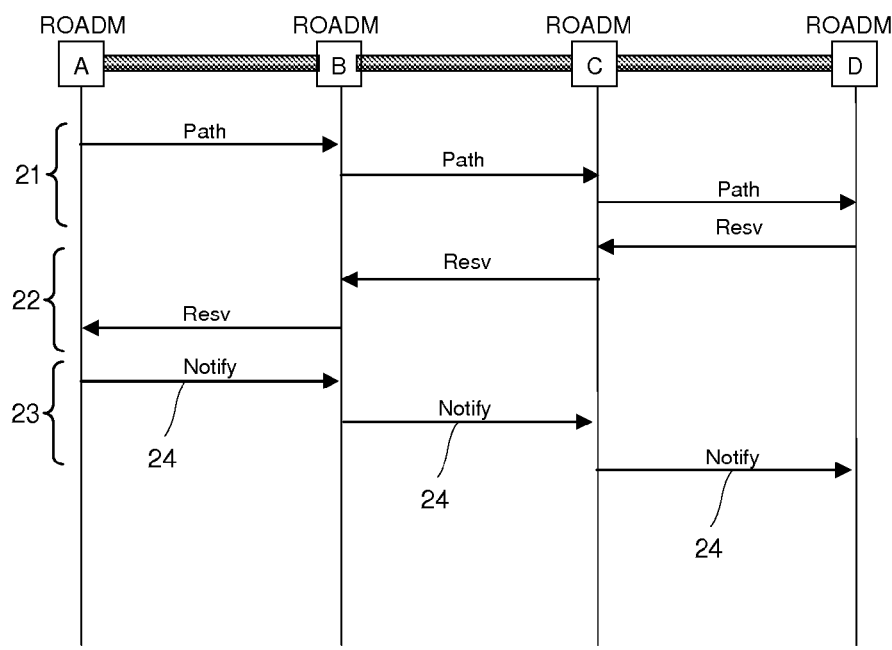

FIGS. 5 and 6 show additional signalling 23 to activate a connection. A signalling message 24 is sent to each of the nodes B, C and D. Advantageously, the signalling message is an RSVP-TE Notify message. A signalling message 24 is sent from node A to node B. The signalling message 24 identifies a connection that is to be activated. When node B receives this message, it causes a power control unit at the node to begin the process of adjusting the optical amplifier to accommodate the new lambda associated with the connection identified in message 24. Typically, the adjusting is a power levelling process. Node B immediately forwards the message 24 to node C, without waiting for the levelling process to finish. The same operations occur at node C. The result is that the power control units at nodes B, C and D adjust their respective optical amplifiers substantially at the same time (i.e. in parallel with each other), Node B does not have to detect that power has been applied to a lambda on an ingress link A-B before applying power to the lambda on link B-C. Similarly, the power control unit at node C can immediately start to apply power to the lambda on link C-D and does not need to wait to detect power on the lambda on link B-C. The term "power control unit" is used when describing the embodiments. The "power control unit" can be a power monitoring unit (PMU) of a conventional node, or it can be a unit without any power monitoring functionality, as the signalling 24 avoids the need to scan to detect the presence of lambdas.

The overall time taken to set up the recovery path ABCD, following detection of a fault is:

signalling time (3 Notify messages)~50 ms
ramp up time, lambda power from 0% to 100% at all nodes in parallel ~4 min The total time is ~4 mins.

As before, there is preliminary signalling (Path message+ RESV message) to set up the recovery path, with a timescale of around 100 ms.

When the signalling is sent to instruct nodes to adjust their optical amplifiers (OA) to set up a new connection, it can be sent along an in-fibre control channel (e.g. OSC) or an out-of-fibre control channel. When the signalling is sent to instruct nodes to adjust their OAs to tear down an existing connection, it can be sent along an in-band control channel, an in-fibre control channel (e.g. OSC) or an out-of-fibre control channel.

Figure 7:
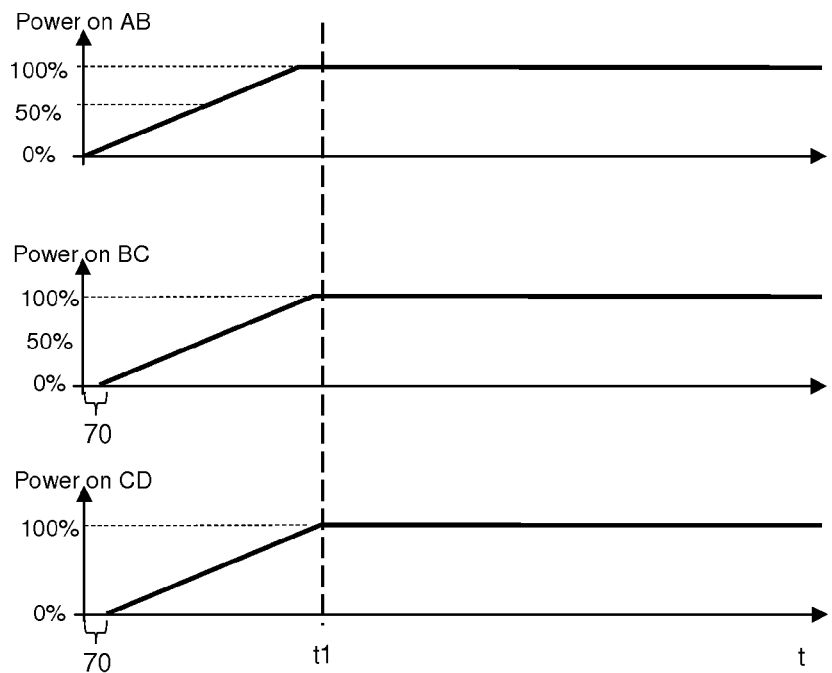
FIG. 7 shows how the connection is established at nodes along the path of the connection according to an embodiment of the invention.

FIG. 7 shows application of power at nodes. Each of the nodes A, B, C applies power to the lambda required by the new connection, on respective links AB, BC and CD. All of the nodes have ramped power to 100% by time t1. It can be seen that the overall time to establish the connection is considerably reduced, compared to FIG. 4. The short delay 70 shown before ramping up power on links BC and CD is due to the propagation time for the signalling message to nodes B and C. This propagation time 70 is not shown to scale in FIG. 7, and is actually much shorter than shown.

The method described above can be used when there is a need to set up and activate a connection or when there is a need to tear-down a connection. When tearing-down a connection, the signalling message indicates that tear-down is required (e.g. a Path Tear message) and the power control unit adjusts the optical amplifier to switch off an optical channel used by the connection. The signalling for set-up and tear-down is as follows:

SET UP: Send Path message along path of connection;
End node sends Resv message back along path of connection; (optional Resv confirm message);
Send Notify message to individual nodes along the path of the connection.

TEAR DOWN: Send Path tear message along path of connection;
End node sends Resv tear message back along path of connection;
Send Notify message to individual nodes along the path of the connection.

The method described above can be applied to any number of connections, and to a combination of connection activation and connection tear down. Advantageously, each connection is individually signalled. A need for multiple connections can arise where a fault affects multiple working paths, and there is a need to transfer traffic from each working path to a respective recovery path. Signalling identifies a connection. GMPLS signalling uses a 5-tuple to uniquely identify an LSP within an operator's network. This 5-tuple comprises: a Tunnel Endpoint Address; Tunnel_ID; Extended Tunnel ID; Tunnel Sender Address and (GMPLS) LSP_ID. Advantageously, the Notify message sent to each node along the path to be activated includes these five fields for each LSP that is going to be set up along the path. The 5-tuple is a way of identifying connections in a GMPLS network and it will be appreciated that a network may use a different combination of identifiers to identify connections. The message sent to nodes carries a suitable set of identifiers to identify the connection to be activated or torn-down.

Figure 8:
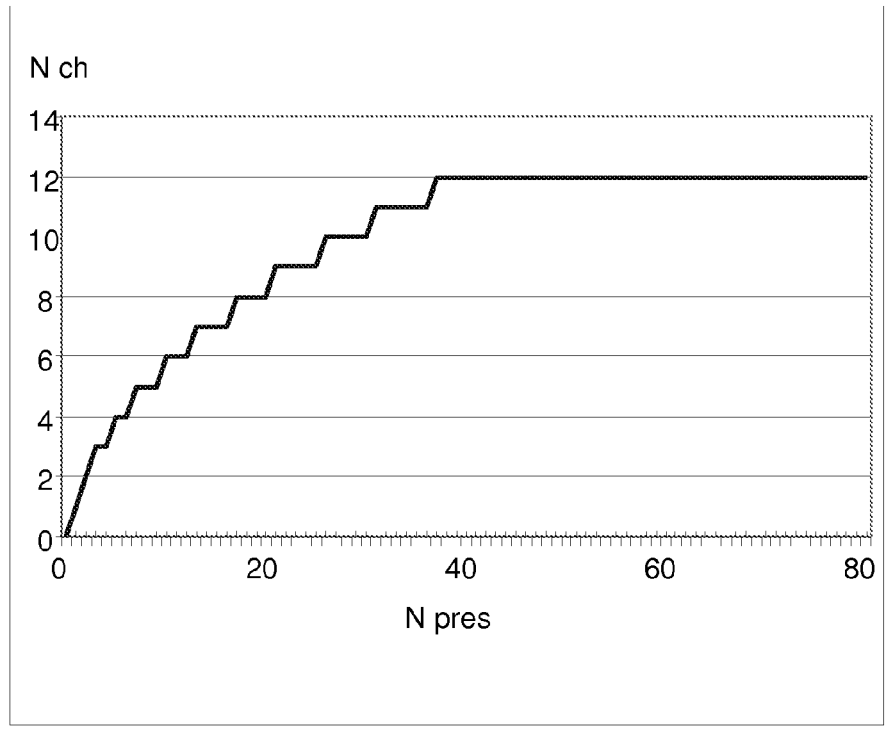
FIG. 8 shows a graph of a number of channels that can be changed concurrently.

Typically, the longest delay in setting up a connection arises from the need to gradually adjust the optical amplifier so as not to disturb existing channels. This is called a levelling process. It is desirable that this levelling process is performed as few times as necessary. In an embodiment of the invention, a node adjusts the optical amplifier to add/remove multiple lambdas at a time. The node determines how many lambdas it can add or drop at the same time. The number of lambdas that can be added or dropped depends on the current number of lambdas. FIG. 8 shows an example relationship between a current number of lambdas and the number of lambdas that can be added (or dropped). Npres is the number of channels already active on a link when the set up/deletion request arrives. Nch is number of channels that can be added or deleted at the same time (i.e. in a single step) by a power control unit. The relationship shown in FIG. 8 can be established by simulation of the behaviour of a node, or by monitoring behaviour of an actual node. The relationship shown in FIG. 8 can be expressed as a formula:

For Npres=0, Nch=1

For 0<Npres<41

Nch=INT [SQRT (Npres)+SQRT (Npres−1)]

For 40<Npres<81

Nch=INT [SQRT (40)+SQRT (39)]=12

The algorithm is applied recursively until the number of set up/deletion requests is satisfied. This algorithm will be called a Dynamic Levelling Algorithm (DLA). It should be understood that the particular values stated above are based on a particular type of transceiver and transmission system. Other types of transceiver/transmission system may require different values.

An example scenario will now be explained. Assume a node currently has four activated channels on a link. Twelve set up requests are received at the same time. The node determines how many channels can be added.

Step 1:

$$Npres = 4 \rightarrow Nch$$
$$= INT[SQRT(Npres) + SQRT(Npres - 1)]$$
$$== INT\ [SQRT(4) + SQRT(3)]$$
$$= 3$$

Applying the formula, 3 channels can be added during a first levelling process. During step 1 the number of channels increases from 4 to 7.

Step 2:

$$Npres = 7 \rightarrow Nch$$
$$= INT[SQRT(Npres) + SQRT(Npres - 1)]$$
$$== INT\ [SQRT(7) + SQRT(6)]$$
$$= 5$$

Applying the formula, 5 channels can be added during a second levelling process. During step 2 the number of channels increases from 7 to 12

Step 3:

$$Npres = 12 \rightarrow Nch$$
$$= INT[SQRT(Npres) + SQRT(Npres - 1)]$$
$$== INT\ [SQRT(12) + SQRT(11)]$$
$$= 6$$

Applying the formula, it would be possible to add up to 6 new channels. However, the number of pending set up requests is 4 (12-3 channels added at step 1-5 channels added at step 2). During step 3 the number of channels increases from 12 to 16 and the method ends.

Using the method described above it is possible to activate 12 new connections in the same time required to actually set up 3 connections. The method described above is performed at each node. In a mesh network, the number of existing channels and/or the number of requests can differ at each node.

The "retuning" performed when activating channels may comprise a power levelling process. When activating a channel, this can gradually ramp-up the power on the newly activated channel(s) and evenly distributing the overall power across the existing channels and newly activated channel(s). The levelling process can also comprise an increase in the output power of the optical amplifier. Changing the number of channels in use on a fibre causes a modification of the power transmitted on the fibre. If there is a small number of existing lambdas in use, the total power in the fibre is low, so adding too many channels at the same time will cause a peak of power in the fibre which can lead to interference to the existing channels. If there is a large number of lambdas in use, the maximum supported power on the fibre has already been reached, so adding new channels requires splitting the overall power between a higher number of channels (reducing the power per channel). In both cases it is not possible to add or remove too many channels at the same time without affecting the other ones. The number of channels that can be added or deleted at the same time depends the number of channels already in use on the link.

Figure 9:
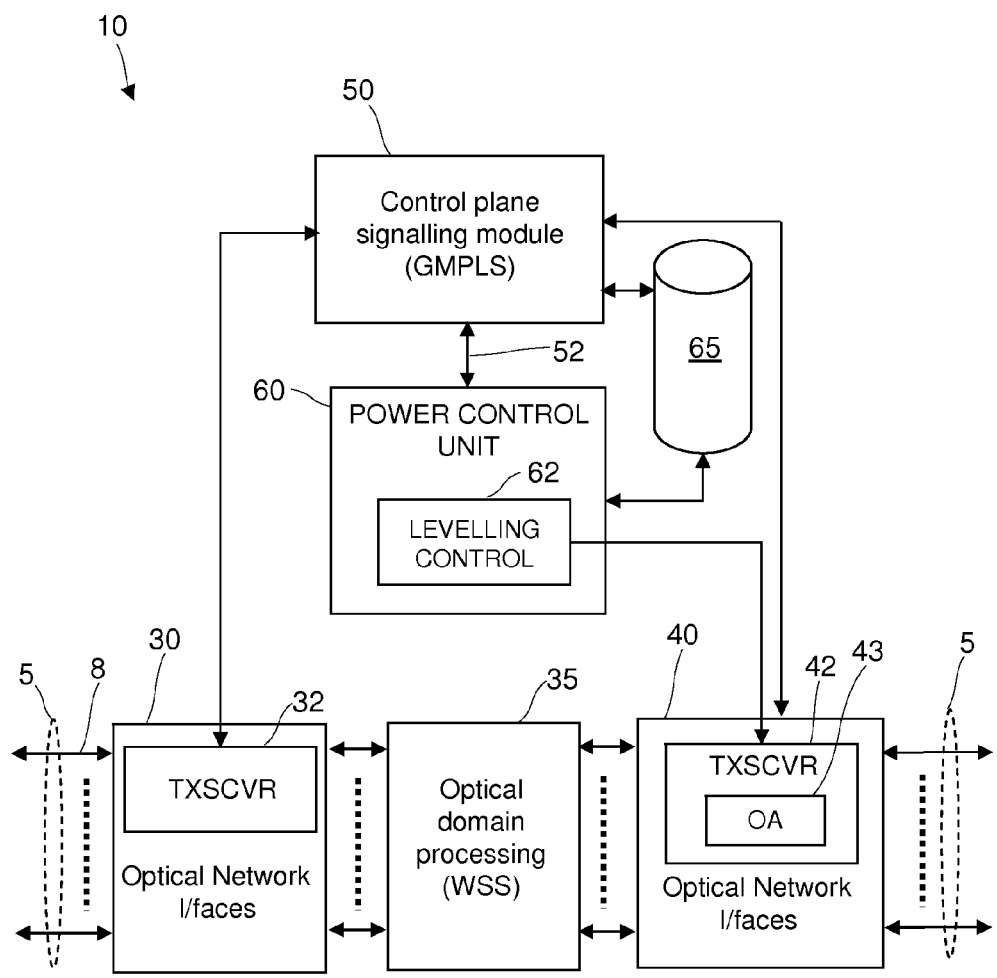
FIG. 9 shows a node for use in the network of FIG. 1.

FIG. 9 shows a node 10 for use in the network of FIG. 1. The node optical has a network interface 30 and a transceiver 32 for connecting to optical links (fibres) 5. The transceiver receives lambdas 8 on a link 5. Another optical network interface 40 has a transceiver 42 and an optical amplifier 43 for transmitting lambdas on the link 5. An optical domain processing stage interconnects interfaces 30, 40 and operates on optical signals received from interface 30, such as performing a wavelength selective switching function.

A power control unit 60 monitors power on each of the lambdas 8 on the link 5. A levelling control function 62 controls output power on each of the lambdas 8, and overall output power of the transceiver 42. The power control unit 60 has a store 65 for holding data. Levelling control 62 performs the Dynamic Levelling Algorithm described earlier. Control 62 monitors the number of requests to activate and discontinue lambdas and determines the number of levelling steps required to most efficiently modify the number of activated lambdas, based on the current number of activated lambdas. Store 65 can store data such as details of pre-signalled connections (acquired during steps 21, 22, FIG. 6), the pending number of requests to activate/tear-down lambdas, and data used by the Dynamic Levelling Algorithm.

A control plane signalling module 50 receives control plane signalling, such as GMPLS RSVP-TE signalling, and outputs instructions 52 to the power control unit 60. The control plane signalling module 50 can also send control plane signalling to other nodes. The control plane signalling module 50 receives signalling via control channels, which are usually photonic. At each node the content of the control channels is converted to the electrical-domain and passed to the control plane module 50. Signalling identifies a connection to be set up or torn down. As described above, GMPLS signalling uses a 5-tuple to identify a connection, and the parameters in this 5-tuple are stored 65. When the node 10 later receives a Notify request to activate a connection, the node uses information carried by connection pre-signalling (steps 21, 22, FIG. 6) and stored in store 65 to identify the requirements of the connection.

For clarity, FIG. 9 shows signalling and control flows for a node which receives lambdas on interface 30 and transmits lambdas on interface 40. It should be understood that bi-directional communication is possible along the same, or different, links 5 connected to each interface 30, 40. The control plane signalling module 50 and power control unit 60 are operably connected with interfaces 30, 40 to implement control for the other direction of communication. The control plane signalling module 50 receives signalling indicative of a need to set up or tear down a connection and issues signalling (e.g. RSVP-TE Notify message) to downstream nodes to cause the nodes to adjust their respective optical amplifiers.

Figure 10:
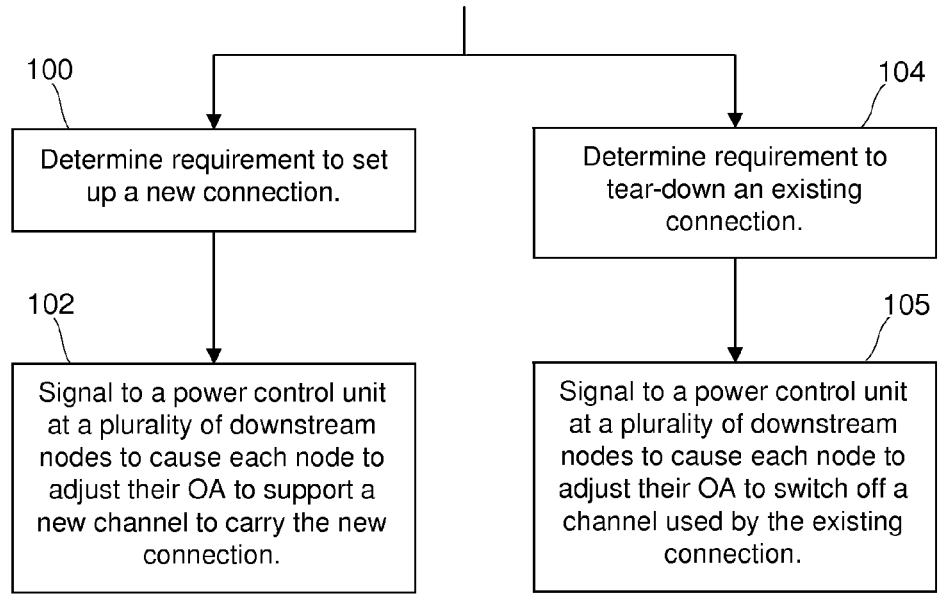
FIG. 10 shows a method performed by an end node of a connection.

FIG. 10 shows a method performed by an end node of a connection. The method can be performed by the control plane signalling module 50 of the end node. Steps 100 and 104 each determine a requirement to make a change to a connection. The node can perform one, or both, of these steps. At step 100 the node determines a requirement to set up a new connection. This can be caused by receiving signalling indicative of a fault having occurred in a working path connection, or signalling requesting a new connection. At step 102 the node issues signalling to nodes along the path of the new connection to cause each node to adjust their optical amplifier to support a channel to carry the new connection. At step 104 the node determines a requirement to tear down an existing connection. This can be caused, for example, by receiving signalling indicating that a working path has been restored or that the connection is no longer required on a permanent basis. Tear down can be caused by two types of event: (i) signalling which instructs tear down and (ii) expiry of a timer. A refresh message is periodically sent along each connection. If a refresh message is not received by a node within a time out period, the connection is automatically torn down. At step 105 the node issues signalling to nodes along the path of the existing connection to cause each node to adjust their optical amplifier to discontinue a channel used to carry the existing connection.

Figure 11:
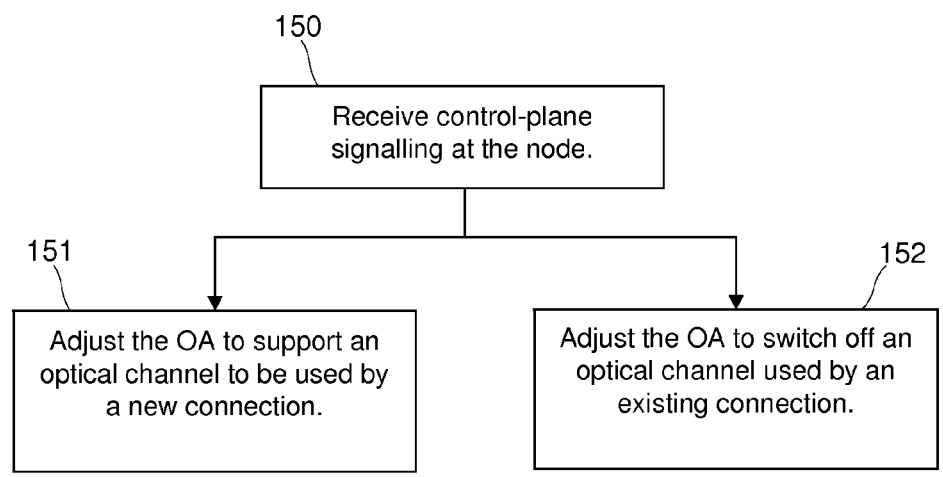
FIGS. 11 and 12 show a method performed by an intermediate node of a connection.

FIG. 11 shows a method performed by an intermediate node along a path of a connection. The method can be performed by the control plane signalling module 50 and power control unit 60 of the node. At step 150 the node receives control plane signalling (e.g. a RSVP-TE Notify message which identifies a connection.) If a connection is being set up, the node causes the optical amplifier to support an optical channel to be used by the new connection. The optical amplifier performs a levelling process. If a connection is being torn down, the node causes the optical amplifier to discontinue an optical channel used by the existing connection.

Figure 12:
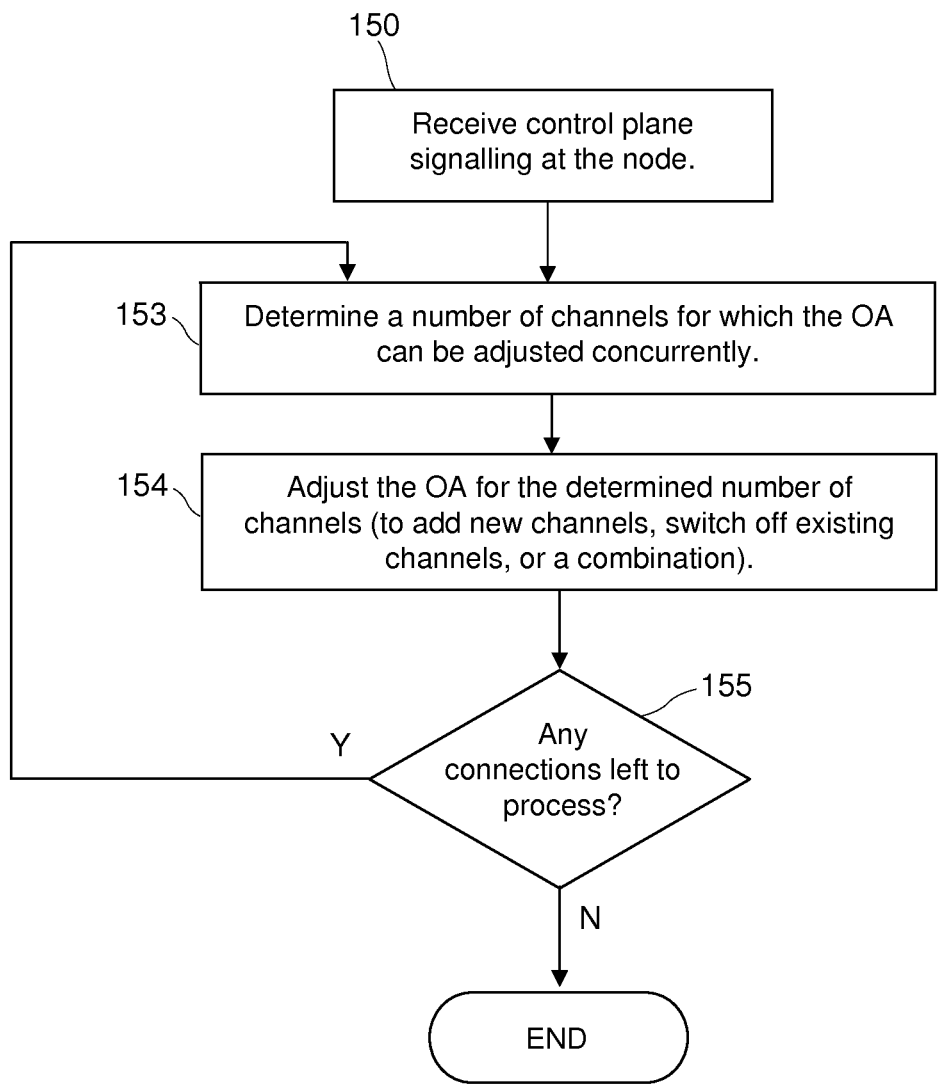

FIG. 12 shows a more detailed embodiment of the method of FIG. 11. As before, control plane signalling is received at step 150. The node may receive signalling in respect of a plurality of different connections which are to be set up, torn down, or a combination of these. Step 153 determines a maximum number of channels for which the optical amplifier can be adjusted concurrently. This is the Dynamic Levelling Algorithm described earlier. Step 154 adjusts the optical amplifier for the number of channels determined at step 153. Step 155 determines if there are any connections left to process. The answer will be positive if the number of connections for which set up or tear-down has been requested exceeded the maximum number determined at step 153. If the answer is positive, the method returns to step 153. The method is repeated iteratively until the answer at step 155 is negative.

Figure 13:
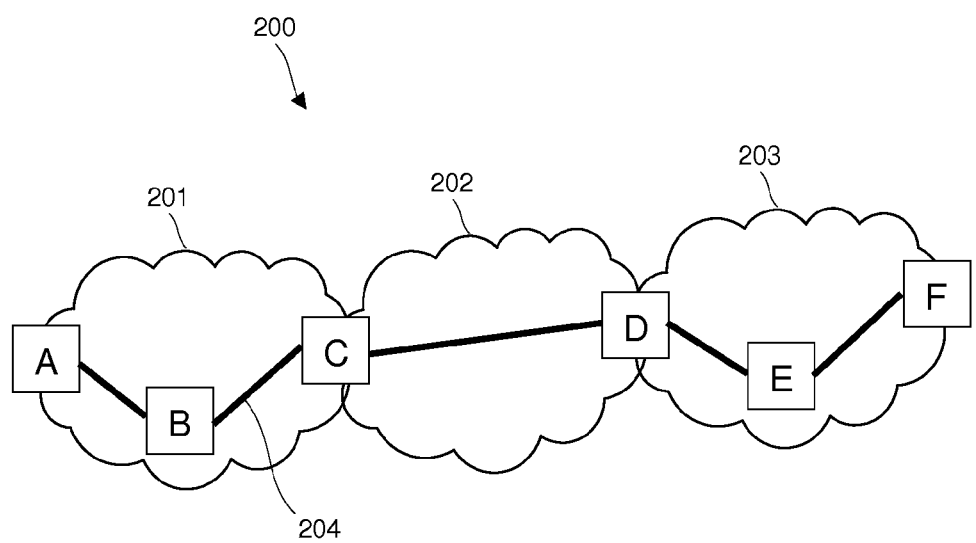
FIG. 13 shows a connection across a multi-technology network.

A further embodiment of the invention is shown in FIG. 13. A multi-technology network comprises at least one optical transmission network and at least one electrical transmission network. A connection can be established, end-to-end, across a combination of at least one optical transmission network segment and at least one electrical transmission network segment. FIG. 13 shows an example of a multi-technology network 200 comprising optical networks 201, 203 and electrical network 202. A connection 204 is established between nodes A-F. Segments A-C and D-F of the connection 204 are optical-domain segments. The signalling to activate a lambda, or switch off a lambda (e.g. shown as 23 in FIG. 6), is sent between nodes in optical transmission network segments (A-C, D-F) of the connection 204. Additionally, the signalling can be forwarded from one optical-domain transmission network segment of the connection to another optical-domain transmission network segment of the connection, by forwarding over an electrical-domain transmission network segment of the connection. In FIG. 13, node A sends signalling to nodes B and C to activate a lambda. Node C can forward the signalling to node D. Node D forwards the signalling to nodes E and F. In this way, a lambda is activated on disjoint optical segments A-C and D-F at substantially the same time, thereby minimising the overall time to set up the connection.

Modifications and other embodiments of the disclosed invention will come to mind to one skilled in the art having the benefit of the teachings presented in the foregoing descriptions and the associated drawings. Therefore, it is to be understood that the invention is not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method of operating a first node in a connection-oriented optical network comprising nodes and optical links between nodes, each node having a power control unit for controlling an optical amplifier at the node, the method comprising, at the first node, at least one of:
   in response to a requirement to set up a new connection in the network, signalling to the power control unit at each of a plurality of downstream nodes along a path of the new connection to cause the power control unit to adjust its respective optical amplifier to support a new optical channel to carry the new connection; and
   in response to a requirement to tear-down an existing connection in the network, signalling to the power control unit at each of a plurality of downstream nodes along a path of the existing connection to cause the power control unit to adjust its respective optical amplifier to switch off an existing optical channel used by the existing connection;
   wherein the signalling is configured such that the power control units of the downstream nodes adjust their respective optical amplifiers in parallel with each other.

2. A method according to claim 1 wherein the signalling comprises sending from the first node a signalling message to the power control unit at each of a plurality of downstream nodes.

3. A method according to claim 1 further comprising an initial step of reserving resources for the new connection at the plurality of nodes along the path of the new connection and the signalling identifies the new connection.

4. A method according to claim 1 wherein the signalling comprises signalling to the power control units of a plurality of nodes along respective paths of a plurality of new connections to apply power to a respective optical channel for each of the new connections.

5. A method according to claim 1 wherein the signalling comprises a Resource Reservation protocol (RSVP-TE) Notify message.

6. A method according to claim 1 wherein the connection-oriented network is a GMPLS network and the signalling is GMPLS signalling.

7. A method according to claim 6 wherein the signalling identifies: a Tunnel Endpoint Address, a Tunnel Identifier, an Extended Tunnel identifier, a Tunnel Sender Address, a Label Switched Path identifier.

8. A method according to claim 1 wherein the signalling is performed in response to receiving a notification of a fault in a first connection, and wherein the new connection is a recovery path for the first connection.

9. A method of operating a node in a connection-oriented optical network in which connections between nodes of the network are carried by optical channels, the node having an optical amplifier and a power control unit for controlling the optical amplifier, the method comprising:
  receiving signalling at the node;
  adjusting the optical amplifier, in response to the signalling, to at least one of:
  support a new optical channel to be used by a new connection; and
  switch off an existing optical channel used by an existing connection;
  wherein the signalling instructs the power control unit of the node and a power control unit of a downstream node to adjust their respective optical amplifiers in parallel with each other.

10. A method according to claim 9 wherein the step of receiving signalling comprises receiving signalling at the node in respect of a plurality of connections and the adjusting step comprises:
  determining a number of optical channels for which the optical amplifier can be adjusted concurrently, based on an existing number of active optical channels;
  adjusting the optical amplifier for the determined number of optical channels.

11. A method according to claim 10 wherein the steps of determining a number of optical channels and adjusting the optical amplifier are performed iteratively, until the optical amplifier has been adjusted for the plurality of connections.

12. A method according to claim 9 wherein the adjusting step is a power levelling process.

13. Apparatus configured as a node in a connection-oriented optical network in which connections between nodes of the network are carried by optical channels, the apparatus comprising:
  an optical amplifier;
  a power control unit configured to control the optical amplifier;
  a signalling module configured to receive signalling; and
  wherein the power control unit is configured to adjust the optical amplifier, in response to signalling received by the signalling module, to at least one of:
  support a new optical channel to be used by a new connection; and
  switch off an existing optical channel used by an existing connection;
  wherein the signalling is configured such that the power control unit of the node and a power control unit of a downstream node adjust their respective optical amplifiers in parallel with each other.

14. A machine-readable medium comprising instructions for causing a processor to perform a method of operating a first node in a connection-oriented optical network comprising nodes and optical links between nodes, each node having a power control unit for controlling an optical amplifier at the node, the method comprising, at the first node, at least one of:
  in response to a requirement to set up a new connection in the network, signalling to the power control unit at each of a plurality of downstream nodes along a path of the new connection to cause the power control unit to adjust its respective optical amplifier to support a new optical channel to carry the new connection; and
  in response to a requirement to tear-down an existing connection in the network, signalling to the power control unit at each of a plurality of downstream nodes along a path of the existing connection to cause the power control unit to adjust its respective optical amplifier to switch off an existing optical channel used by the existing connection;
  wherein the signalling is configured such that the power control units of the downstream nodes adjust their respective optical amplifiers in parallel with each other.

* * * * *